United States Patent [19]
Ikeda et al.

[11] Patent Number: 5,699,057
[45] Date of Patent: Dec. 16, 1997

[54] WARNING SYSTEM FOR VEHICLE

[75] Inventors: Atsushi Ikeda, Atsushi; Takashi Kimura, Ohta; Kenji Uematsu, Ouara, all of Japan

[73] Assignee: Fuji Jukogyo Kabushiki Kaisha, Japan

[21] Appl. No.: 646,133

[22] Filed: May 7, 1996

[30] Foreign Application Priority Data

Jun. 16, 1995 [JP] Japan ................... 7-150630

[51] Int. Cl.[6] .................................. G08G 1/107
[52] U.S. Cl. ..................... 340/937; 340/903; 340/435; 348/119; 364/424.02; 382/104
[58] Field of Search ...................... 340/903, 937, 340/435, 439; 348/119, 148; 382/104; 364/424.02

[56] References Cited

U.S. PATENT DOCUMENTS

| 5,410,346 | 4/1995 | Saneyoshi et al. | 346/118 |
|---|---|---|---|
| 5,450,057 | 9/1995 | Watanabe | 340/435 |
| 5,515,448 | 5/1996 | Nishitani | 340/435 |
| 5,530,420 | 6/1996 | Tsuchiiya et al. | 340/435 |
| 5,555,312 | 9/1996 | Shima et al. | 340/937 |

Primary Examiner—Jeffery Hofsass
Assistant Examiner—Daniel J. Wu
Attorney, Agent, or Firm—Beveridge, DeGrandi, Weilacher & Young, L.L.P.

[57] ABSTRACT

A warning system for a vehicle comprises a pair of stereoscopic cameras, image recognizing means for processing images, two warning devices disposed on the left and right side of a driver, the deviation judging means for judging a possibility of deviation from the lane where the vehicle runs or a possibility of collision to obstacles and warning control means for determining the warning device to be operated. When the vehicle has a possibility of deviation from the lane or a possibility of collision to obstacles, either left or right side of the warning device inform the driver of the possibility of deviation or collision, whereby the driver can take a quick action for avoiding hazard. Further, when the vehicle runs on a narrow load, the driver can know an inability of passing through the road by the left and right warning devices operated simultaneously.

20 Claims, 4 Drawing Sheets

WARNING SYSTEM FOR VEHICLE

BACKGROUND OF THE INVENTION

1. Field of the Invention

In an motor vehicle equipped with an ADA system (Active Drive Assist System) for assisting a vehicle operator with vehicle operations, the present invention relates to a warning system that raises an alarm to the vehicle operator about a possibility of deviation from the lane on which the vehicle is running and particularly to a warning system for informing the vehicle operator of a possible direction of deviation from the lane by means of the image data obtained from a front monitoring camera on the vehicle.

2. Prior Arts

Recently, with an increase of traffic accidents, a so-called ADA system (Active Drive Assist System), namely, a total vehicle operation assisting system for positively assisting vehicle operations in order to avoid hazards in advance, is being developed. The ADA system is a system in which possibilities of a deviation from the lane, a collision from behind and the like are estimated by recognizing road conditions, white markers on the road, traffic circumstances and the like based upon the image data of a front monitoring camera installed on the vehicle, when a vehicle operator falls asleep, or where he or she drives inattentively. According to the ADA system, when the vehicle deviates from the lane, the system raises an alarm to the vehicle operator so as to urge him or her to take an avoidance action from the standpoint that the vehicle should be operated by human beings.

Therefore, the warning apparatus of the ADA system is very important in bringing the vehicle operator into a hazard avoidance action. Hence, the warning apparatus needed to offer proper information to the vehicle operator without giving an unpleasant feeling.

With respect to the warning apparatuses of prior arts, for example, Japanese Unexamined Patent Application Toku-Kai-Hei 6-251298 discloses a technique in which, when markers for informing the reduction of numbers of lanes are detected by signals from a camera and when the vehicle is continued to be operated at a certain speed and more without turning on a turn signal switch and further without applying a brake, a warning is indicated so as not to deviate the vehicle from the lane on which the vehicle is currently running to the left or to the right. Further, Japanese Unexamined Patent Application Toku-Kai-Hei 6-253311 discloses a technique in which, when a distance between a white marker and the vehicle becomes less than a specified value and when the vehicle the turn signal is not switched on, a deviation from the lane is warned to the vehicle operator.

Since it is simply warned that the vehicle is deviated from the lane, it can not be judged which direction the vehicle has deviated, to the left or to the right. That is to say, there are two cases in the event of the deviation from the lane, One is a case where the vehicle is deviated from the white marker on the left (right) side and comes close to the guard rail or the sideway and another is a case where the vehicle is deviated from the white marker on the right (left) side and comes close to the passing lane or the oncoming lane. Consequently, even if the vehicle operator notices the warning, there is a fear that it is too late for the vehicle operator to take a proper action for avoiding the hazard, because he or she can not judge momentarily which direction the vehicle has deviated. To avoid this, it can be considered that the timing for raising alarm is advanced, however in this case alarms are raised more frequently because warnings of slight deviations are increased. This provides the vehicle operator with uncomfortable feelings.

SUMMARY OF THE INVENTION

Accordingly, the present invention is intended to obviate the aforementioned problems and disadvantages of the prior arts and an object of the present invention will be summarized as follows:

An object of the present invention is to provide a vehicular warning system capable of raising an alarm to a vehicle operator about a possibility that the vehicle is being deviated either to the left or to the right so as to urge the vehicle operator to take an appropriate corrective action for avoiding a hazard.

In order to achieve the object, the warning system according the present invention comprises:

A warning system of a vehicle for raising an alarm to a vehicle operator about a possibility of deviation from a lane where said vehicle runs based on image data of objects obtained from a stereoscopic monitoring camera, comprising:

a stereoscopic monitoring camera for imaging objects ahead of the vehicle and for producing image data of the objects;

a pair of warning devices located on the left and right side of a vehicle operator for raising an alarm about a possibility of deviation from a lane where the vehicle runs;

image recognizing means for recognizing a three-dimensional image of the objects based on the image data and for outputting three-dimensional signals of the objects;

deviation judging means responsive to the three-dimensional signals of the objects for judging which direction and what extent the vehicle is deviated and for outputting a direction signal and an extent signal; and warning control means responsive to the direction signal and for outputting the alarm from the left warning device when there is the possibility on the left side and for outputting the alarm from the right warning device when there is the possibility on the right side.

BRIEF DESCRIPTION OF THE DRAWINGS

Preferred embodiments of the present invention will hereinafter be described by reference to the accompanying drawings, in which.

DETAILED DESCRIPTION OF THE INVENTION

Figure 1:
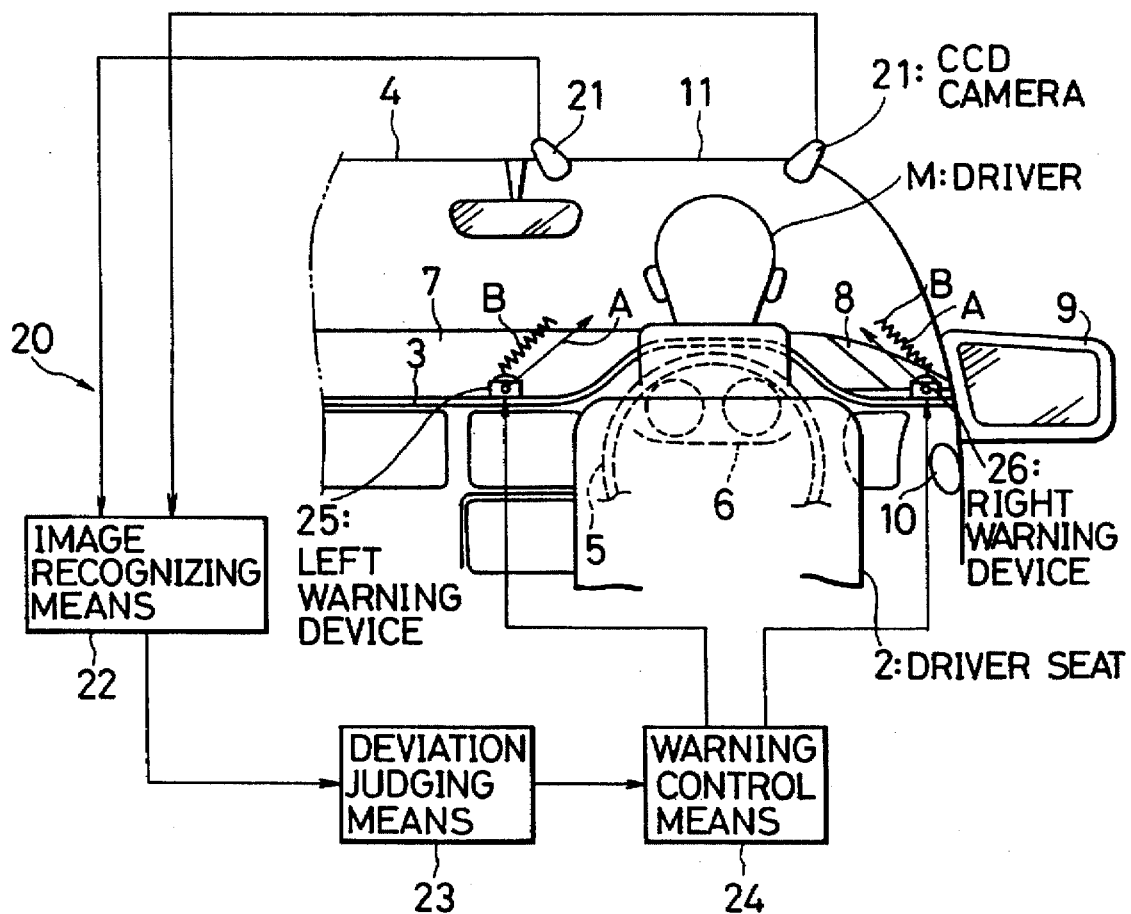
FIG. 1 is a basic construction diagram of a warning system according to a first preferred embodiment of the present invention.

Referring now to FIG. 1, a vehicle has a driver seat 2 on the right side of the front compartment. Further, a dash board 3, a front window 4, a steering wheel 5, an instrument panel 6 and the like are disposed in front of the driver seat 2. A driver M can see an engine hood 7 and a fender 8 through the front window 4. Further, a door mirror 9 and a speaker 10 for an audio system are disposed on the left and right side (only shown in right side in FIG. 1) of the driver seat 2.

Next, an ADA system 20 according to the present invention will be described.

As a monitoring apparatus of the ADA system 20, two CCD cameras 21 are mounted on a ceiling 11 of the compartment and picture signals of these CCD cameras 21 are inputted to an image recognizing means 22. In the image recognizing means 22, image signals taken by these two CCD cameras 21 are subjected to a triangulation process according to a stereoscopic method to calculate the distance between the cameras and objects. The distance information is produced for all images and the image plane is filled with distance images composed of three-dimensional distance distribution. From thus obtained distance images, lanes, vehicles running ahead, obstacles and the like are separated and the three-dimensional configuration of these objects are recognized. Further, at the same time the relative distances to obstacles or vehicles and the relative velocities thereto are calculated and recognized. Thus, image data concerning roads and traffic circumstances are obtained.

Figure 3:
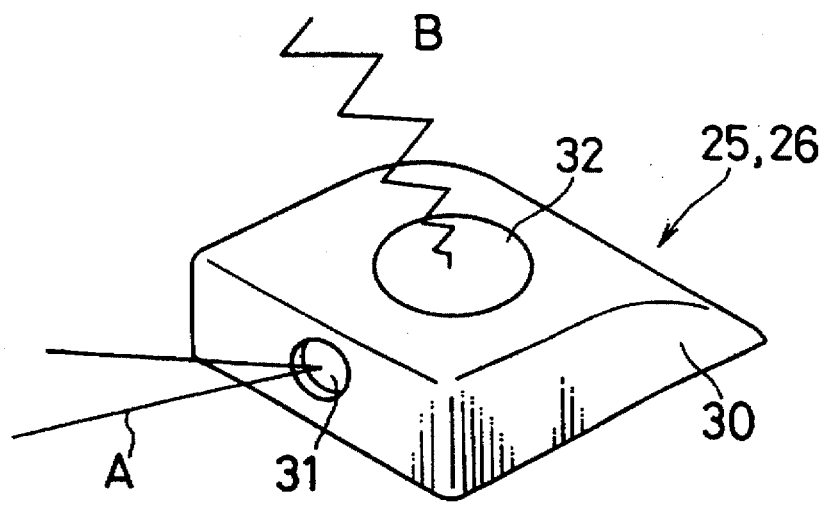
FIG. 3 is a perspective view showing a warning system according to a first embodiment of the present invention.

Further, as a warning apparatus of the ADA system 20, in this embodiment two warning devices 25, 26 are disposed in the compartment. The warning devices 25, 26 are constituted so as to warn the driver M by means of a light A and a sound B. A case 30 thereof integrally contains a warning light 31 and a speaker 32, as shown in FIG. 3. Further, these warning devices 25, 26 are disposed respectively on the left and right side of the driver M on the driver seat 2 and are located at the position where visibility is not obstructed, for example, near the boarder of the front window 4 and the dash board 3.

Figure 2:
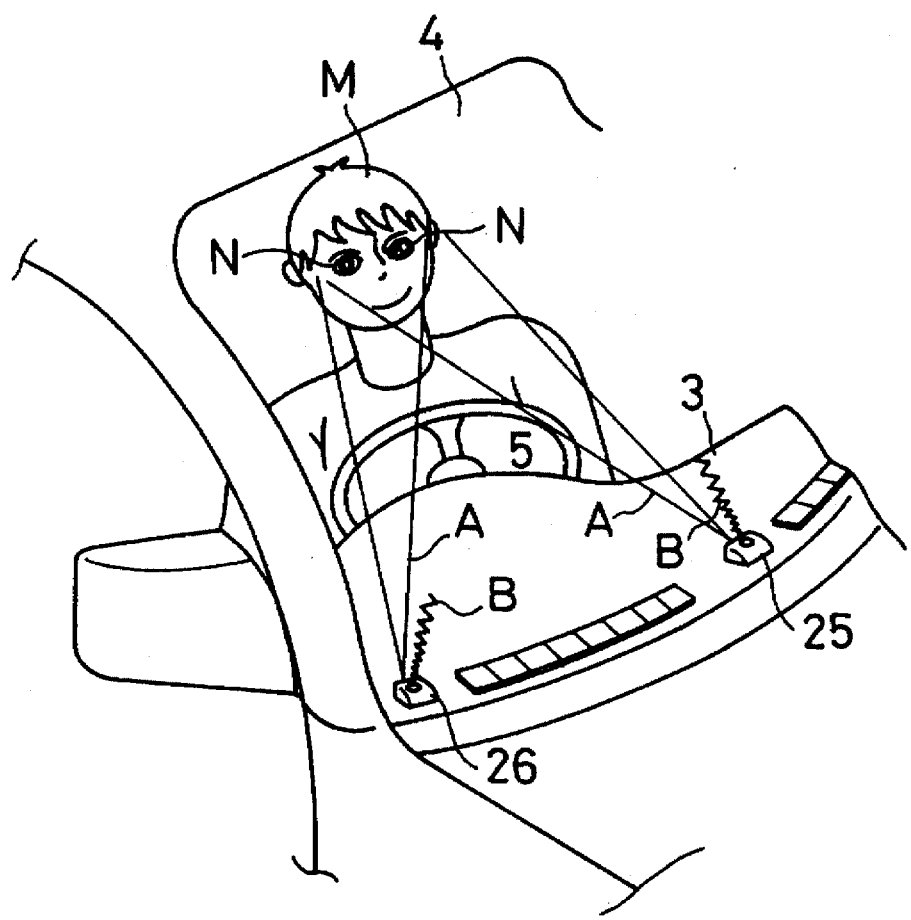
FIG. 2 is a perspective view showing a location of a warning system according to a first preferred embodiment of the present invention.

In order to secure a visibility even in daylight, the warning light 31 radiates a flickering light A with a specified color to an eye position of the driver M, namely, a so-called eye point N as shown in FIG. 2. Further, the speaker 32 is constituted so as to generate an intermittent sound B with a specified volume.

The image data of the image recognizing means 22 are inputted to a deviation judging means 23 wherein it is judged whether or not the vehicle has a possibility of deviation from the lane to the left or to the right, The deviation from the lane is estimated as follows: where H1 is a left white maker of the lane; H2 is a right white marker of the lane; YL is a distance from the vehicle to H1; YR is a distance from the vehicle to H2 (YL is negative to the left and YR is positive to the right); D is a width of the lane; and Y is a distance between the vehicle and the center line of the lane, D is calculated as D=YR−YL and Y is expressed as Y=(D/2)−YR=−(YR+YL)/2. Further, where W is a maximum width of the vehicle, the deviation is judged as follows:

If $Y \geq 0$ and $Y+(W/2) \geq D/2$, the vehicle is deviated to the right side and the magnitude of the deviation, i.e., the extent of the possibility of deviation is judged as $Y+(W/2)$. Further, if $Y<0$ and $-Y-(W/2)<-D/2$, the vehicle is deviated to the left side and the extent of the deviation is judged as $-Y-(W/2)$.

On the other hand, in case where the vehicle runs on a road without white markers, miscellaneous obstacles and the position thereof are detected and the deviation from the lane can be calculated in the same manner as described above. For example, the possibility of collision against an obstacle either on the left or on the right, or the possibility of being unable to pass through a narrow road are estimated. These possibilities or correctly the extent of possibilities are converted into signals and these signals are inputted to the warning control means 24. The warning control means 24 generates a warning sinal to the left warning device 25 when there is a possibility of collision to the left side obstacle, or to the right warning device 26 when there is a possibility of collision to the right side obstacle. In this case, the condition of the light of the warring light 21 or the condition of the sound of the speaker 32 can be changed according to the extent of the possibility of collision or the extent of the possibility of being unable to pass through.

Figure 4:
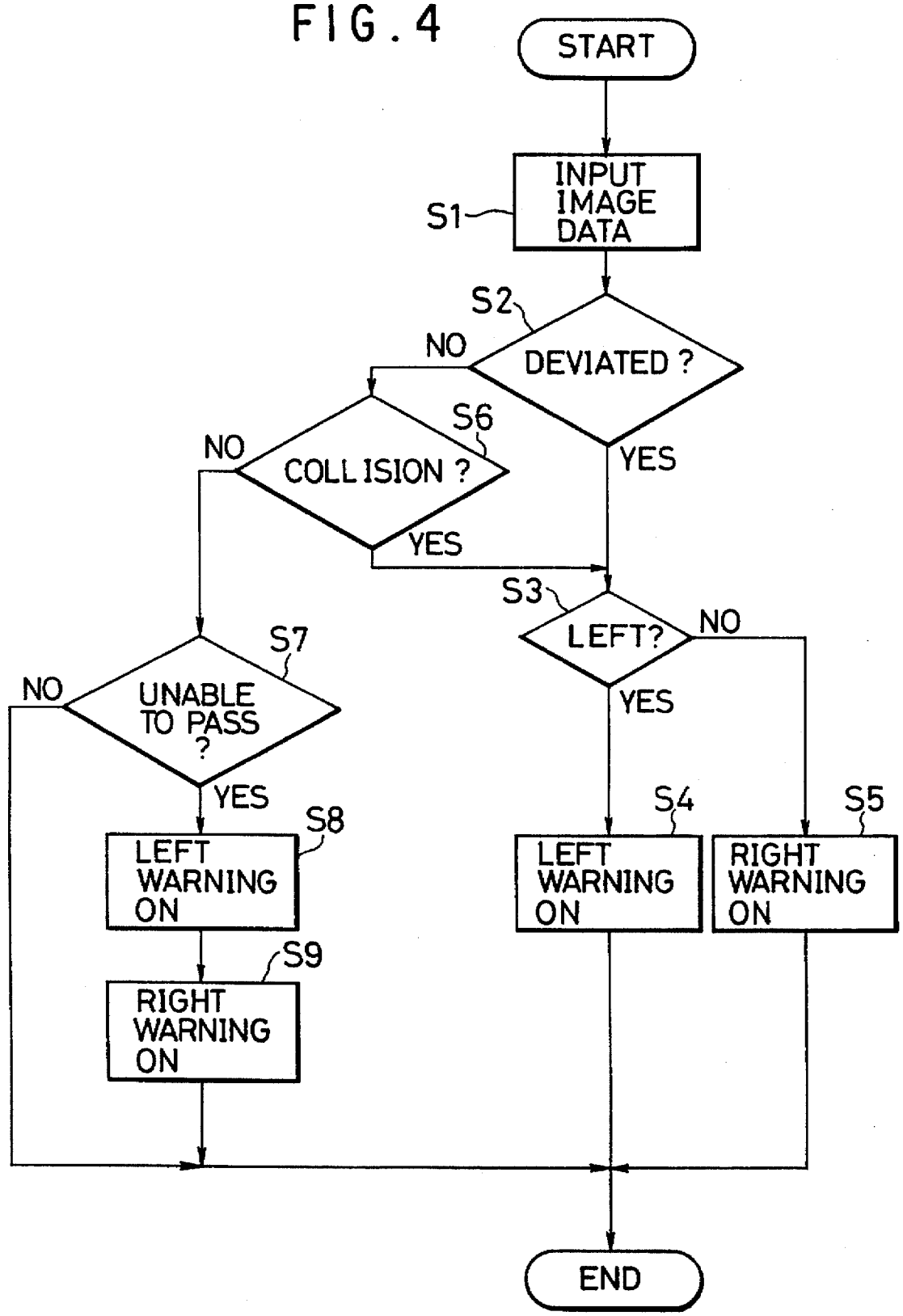
FIG. 4 is a flowchart of a warning control.

Next, the way of the warning control will be described by reference to a flowchart shown in FIG. 4.

First, at a step S1, when the driver M operates the vehicle, the image signals imaged by the two CCD cameras 21 of sceneries and objects located ahead of the vehicle are processed and the image data about the road and traffic circumstances are obtained. Then, the program goes to a step S2 where it is judged whether or not there is a possibility of deviation from the lane and if there is any, which way the vehicle is deviated from the lane, to the left or to the right is judged. If it is judged that there is no possibility of deviation, the program skips to a step S6 where it is judged whether or not there is a possibility of collision against the left or right obstacles. If there is no possibility of collision, it is judged that the vehicle runs roughly in the center of the lane. After that, at a step S7 it is judged whether or not there is a possibility of inability to pass through the narrow road and if such a possibility does not exist, it is judged that the vehicle runs on the road properly.

Further, when the driver M drives the vehicle inattentively or is falling asleep, the vehicle tends to deviate outside of the left or right white markers. Even during a normal operation, when the vehicle makes a turn at high speed or when the driver turns the steering wheel to avoid an obstacle on the road, there is a likelihood that the vehicle is deviated from the left or right white markers. In any of these cases, a deviation from the lane can be detected.

At a step S3, it is judged whether or not there is a possibility of deviation to the left. If there is a possibility, the program goes to a step S4 wherein the warning light 31 of the left warning device 25 radiates the flickering light A with a specified color to the eye point N of the driver M from the left side and at the same time the speaker 32 generates a warning sound B.

Therefore, even in case where the driver M looks aside as well as in case where he or she faces straight ahead, the light A of the warning light 31 comes into eyes of the driver M from the left side diagonally. Further, he or she can hear the warning sound B from the left side.

The light A and the sound B can be varied according to the extent of the possibility of deviation from the lane. That is to say, the warning device can be constituted such that an interval of the flickering light is shortened or the color of the light is changed, for example, from blue to yellow or from yellow to red, as the possibility becomes high. Further, with respect to the warning sound, the sound can be changed from intermittent to continuous or the volume changed from small to large as the possibility becomes high.

If there is no possibility of deviation to the left side, a possibility of deviation to the right side is checked. If there is a possibility of deviation to the right side, at a step S5 the warning light 31 of the warning device 26 on the right side radiates a flickering light A with a specified color to the eye point N of the driver N from the right side and at the same time the speaker 32 on the right side produces a warning sound B.

Thus, the driver M is able to take an appropriate action for avoiding hazard according to the instruction of the left or right warning device. In an actual operation of the vehicle, the driver M gets used to the warning system and grows accustomed to taking a swift avoidance action in a conditioned reflex fashion without judging the position where warning is generated.

When the vehicle changes a lane, the vehicle is deviated from the lane. In this case, the warning system can be constituted so as to cancel an operation of the warning system, whereby an unnecessary warning is prevented. For example, when the driver operates a turn signal switch or brakes, the warning can be canceled.

The warning device is operated when the vehicle detects an obstacle ahead. Further, when it is judged that the vehicle can not pass through the narrow road, both left and right warning devices 25, 26 are operated to inform the driver of an inability to pass through, as shown in steps S8 and S9.

In this embodiment, the warning devices 25, 26 are integrally formed with the warning light 31 and the speaker 32. However, the warning light 31 can be disposed separately from the speaker 32. Further, the speaker 32 can employ the audio speaker.

Figure 5:
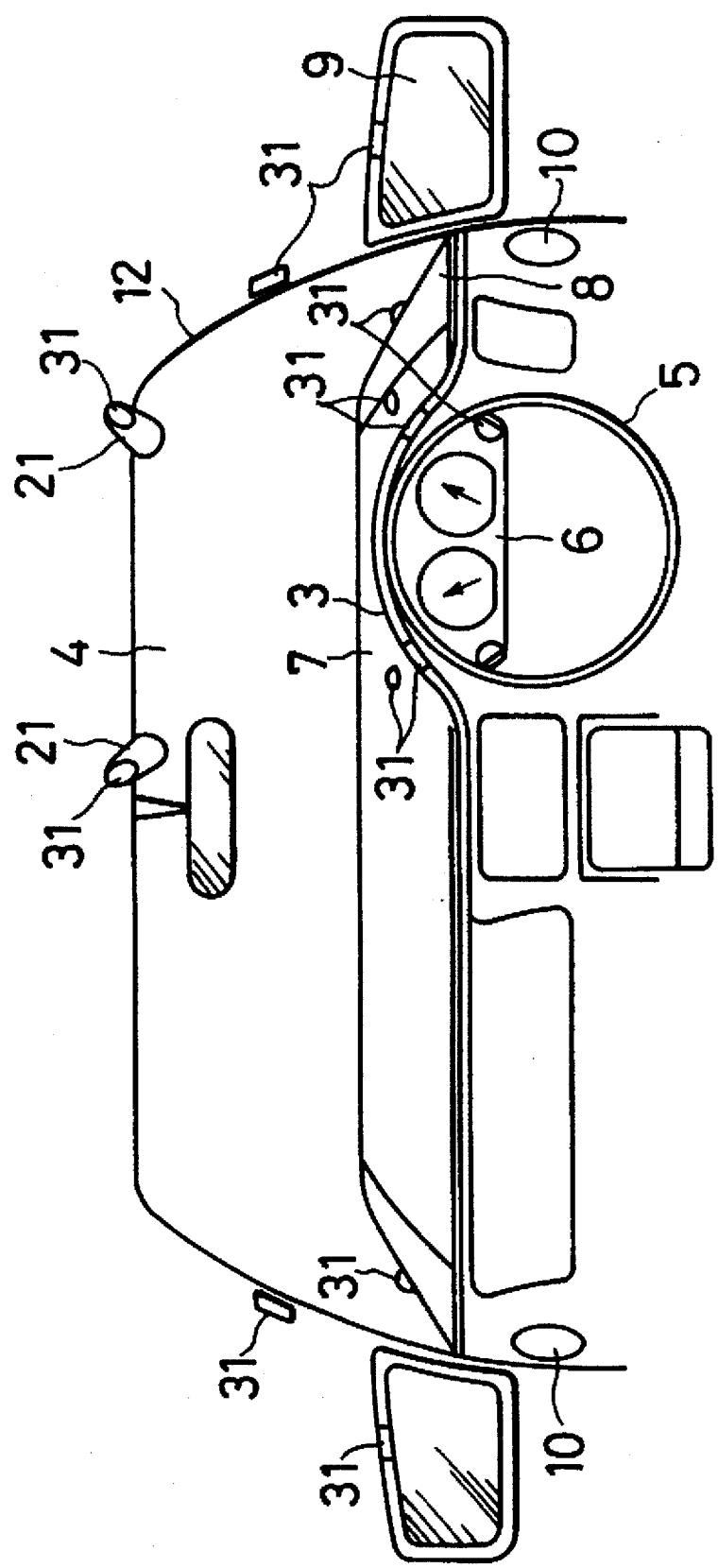
FIG. 5 is a view showing a location of a warning system according to a second preferred embodiment of the present invention.

The warning light 31 may be disposed at any position not only inside but also outside of the compartment, if visibility is secured. In an embodiment shown in FIG. 5, the warning light 31 is disposed behind the two CCD cameras 21, on the left and right front pillars 12, on the left and right side of the visor, on the left and right side of the fender 8 or the engine hood 7, or on the left and right door mirrors. Further, the left and right fender markers may be used for the warning light.

Particularly, when the vehicle runs on the narrow road, the warning light on the front pillar or on the door mirror is very convenient to the driver M because the driver's eyes naturally go to the left and right side.

As for other style of the warning device, employing a head-up display, mounting an acoustic or vibration means on the seat or the seat-back and the like can be considered. These devices or means may be used solely or may be used in combination with the aforementioned warning devices 25, 26.

In summary, according to the present invention, the warning system comprises two warning devices disposed on the left and right side of the driver, the deviation judging means for judging a possibility of deviation from the lane or a possibility of collision to obstacles. When the vehicle has a possibility of deviation from the lane or a possibility of collision with obstacles, either the left or the right side of the warning device informs the driver of the possibility of deviation or collision, whereby the driver can take a quick action to avoid hazard. Further, when the vehicle runs on a narrow load, the driver can know an inability of passing through the road by the left and right warning devices operated simultaneously.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for a vehicle to inform a vehicle operator of driving conditions on the basis of image data of an object obtained from a stereoscopic monitoring camera system, comprising:

a right warning device located on a right side of said vehicle operator;

a left warning device located on a left side of said vehicle operator;

image recognizing means for recognizing an image of said object based on said image data and for outputting an image signal indicative thereof;

deviation judging means responsive to said image signal for judging a direction of said vehicle and an extent of deviation therefrom and for outputting a direction signal and an extent signal indicative thereof; and warning control means responsive to said direction signal and said extent signal for activating said left warning device when a possibility of deviation on a left side of said vehicle is judged and for activating said right warning device when a possibility of deviation on a right side of said vehicle is judged.

2. The system according to claim 1, wherein
said left and said right warning devices each emit a light signal when activated, said light signal being radiated to an eye point of said vehicle operator.

3. The system according to claim 1, wherein
said left and said right warning devices each produce a sound signal when activated.

4. The system according to claim 1, wherein
said left and said right warning devices each produce a combination of a light signal and a sound signal when activated.

5. The system according to claim 1, wherein:
at least one of said left and said right warning devices comprise a speaker used for an audio system of said vehicle.

6. The system according to claim 4, wherein:
said light signal is radiated to an eye point of said vehicle operator.

7. The system according to claim 1, wherein:
said object comprises road lane markers.

8. The system according to claim 7, wherein:
said road lane markers comprise white road lane markers.

9. The system according to claim 1, wherein:
said right warning device has an intensity dependant on said extent of deviation judged by said deviation judging means.

10. The system according to claim 1, wherein:
said left warning device has an intensity dependant on said extent of deviation judged by said deviation judging means.

11. An active drive assist system for an vehicle, comprising:

means for determining positions of a plurality of objects and for generating an object position signal indicative thereof;

means for determining a position of said vehicle relative said positions of said objects and for generating a vehicle position signal indicative thereof;

first judging means, receiving and responsive to said object and said vehicle position signals, for judging a direction deviation of said vehicle and for generating a direction signal indicative thereof;

second judging means, receiving and responsive to said object and said vehicle position signals, for judging a possibility of collision with said objects and for generating a collision signal indicative thereof;

third judging means, receiving and responsive to said object and said vehicle position signals, for judging an inability of said vehicle to pass between two of said objects and for generating a passing signal indicative thereof;

informing means, receiving and responsive to said direction signal, said collision signal and said passing signal, for informing an operator of said vehicle of a direction deviation, a possibility of collision or an inability of said vehicle to pass between two of said objects.

12. The active drive assist system defined by claim 11, wherein:
said informing means includes a left informing device positioned on a left side of said operator and a right informing device positioned on a right side of said operator.

13. The active drive assist system defined by claim 12, wherein:
said informing means activates said left informing device when a left direction deviation is judged by said first judging means.

14. The active drive assist system defined by claim 13, wherein:
said informing means activates said right informing device when a right direction deviation is judged by said first judging means.

15. The active drive assist system defined by claim 12, wherein:
said informing means activates said left informing device when a possibility of collision on a left side of said vehicle is judged by said second judging means.

16. The active drive assist system defined by claim 15, wherein:
said informing means activates said right informing device when a possibility of collision on a right side of said vehicle is judged by said second judging means.

17. The active drive assist system defined by claim 12, wherein:
said informing means activates said left informing device and said right informing device when said inability of said vehicle to pass between two of said objects is judged by said third judging means.

18. The active drive assist system defined by claim 12, wherein:
said informing means activates said left informing device when a left direction deviation is judged by said first judging means,
said informing means activates said right informing device when a right direction deviation is judged by said first judging means,
said informing means activates said left informing device when a possibility of collision on a left side of said vehicle is judged by said second judging means,
said informing means activates said right informing device when a possibility of collision on a right side of said vehicle is judged by said second judging means, and
said informing means activates said left informing device and said right informing device when said inability of said vehicle to pass between two of said objects is judged by said third judging means.

19. The active drive assist system defined by claim 12, further comprising:
prevention means for preventing said informing means from activating said left or said right informing devices based on said direction signal when said brake of said vehicle is applied or said directional signal of said vehicle is operated.

20. A method for notifying an operator of a vehicle of driving conditions, said vehicle having a left informing device positioned on a left side of said operator and a right informing device positioned on a right side of said operator, said method comprising:
determining positions of objects and generating an object position signal indicative thereof;
determining a position of said vehicle relative said positions of said objects and generating a vehicle position signal indicative thereof;
judging a direction deviation of said vehicle in response to said object and said vehicle position signals and generating a direction signal indicative thereof;
judging a possibility of collision with said objects in response to said object and said vehicle position signals and generating a collision signal indicative thereof;
judging an inability of said vehicle to pass between two of said objects in response to said object and said vehicle position signals and generating a passing signal indicative thereof; and
activating said left or said right informing devices in response to said direction, said collision and said passing signals to respectively notify said operator of said vehicle of a direction deviation, a possibility of collision or an inability of said vehicle to pass between two of said objects.

* * * * *